United States Patent
Thum et al.

(10) Patent No.: US 10,968,079 B2
(45) Date of Patent: Apr. 6, 2021

(54) TRANSPORTATION DEVICE COMPRISING A SAFETY DEVICE FOR LIMITING DECELERATION

(71) Applicant: TK Elevator Innovation and Operations GmbH, Essen (DE)

(72) Inventors: Richard Thum, Kornwestheim (DE); Marius Matz, Filderstadt (DE); Eduard Steinhauer, Nürtingen (DE)

(73) Assignee: TK Elevator Innovation and Operations GmbH, Essen (DE)

( * ) Notice: Subject to any disclaimer, the term of this patent is extended or adjusted under 35 U.S.C. 154(b) by 12 days.

(21) Appl. No.: 16/334,856

(22) PCT Filed: Sep. 14, 2017

(86) PCT No.: PCT/EP2017/073079
§ 371 (c)(1),
(2) Date: Mar. 20, 2019

(87) PCT Pub. No.: WO2018/054747
PCT Pub. Date: Mar. 29, 2018

(65) Prior Publication Data
US 2020/0017334 A1 Jan. 16, 2020

(30) Foreign Application Priority Data
Sep. 23, 2016 (DE) ...................... 10 2016 118 028.9

(51) Int. Cl.
*B66B 11/04* (2006.01)
*B66B 5/04* (2006.01)
*H02K 41/02* (2006.01)

(52) U.S. Cl.
CPC .......... *B66B 11/0407* (2013.01); *B66B 5/044* (2013.01); *H02K 41/02* (2013.01)

(58) Field of Classification Search
CPC ..... B66B 11/0407; B66B 21/04; H02K 41/02; H02P 21/0003; H02P 21/2506
See application file for complete search history.

(56) References Cited

U.S. PATENT DOCUMENTS 5,014,826 A * 5/1991 Nakai .................. H02K 41/025
187/289
5,234,079 A 8/1993 Nomura
(Continued)

FOREIGN PATENT DOCUMENTS

| DE | 1947980 A  | 4/1970 |
| DE | 19800410 A | 7/1999 |
| EP | 1818305 A  | 8/2007 |

OTHER PUBLICATIONS

English Translation of International Search Report issued in PCT/EP2017/073079, dated Nov. 29, 2017.

*Primary Examiner* — Diem M Tran
(74) *Attorney, Agent, or Firm* — William J. Cassin

(57) ABSTRACT

A transportation device such as an elevator installation, an escalator, or a moving walkway may comprise a person conveying unit and an electromagnetic linear drive for driving the person conveying unit. The electromagnetic linear drive may include a stator segment and a runner element. The runner element can be driven by the force of an electromagnetic field of the stator segment in a first drive direction or in an opposite second drive direction. The runner element is movably mounted on the person conveying unit such that a magnetic resistance in an air gap between the stator segment and the runner element is adjustable depending on a drive force acting between the stator segment and the runner element.

20 Claims, 3 Drawing Sheets

(56) References Cited

U.S. PATENT DOCUMENTS

| | | |
|---|---|---|
| 6,425,462 B1 | 7/2002 | Tran |
| 2004/0216960 A1 | 11/2004 | Kocher |
| 2008/0257655 A1* | 10/2008 | Ito .......................... G01G 19/18 187/406 |
| 2017/0355567 A1* | 12/2017 | Schmidt ................... H02K 1/12 |
| 2019/0233251 A1* | 8/2019 | Hakala .................... B66B 11/02 |
| 2020/0195182 A1* | 6/2020 | Lahteenmaki .......... B66B 1/308 |

* cited by examiner

TRANSPORTATION DEVICE COMPRISING A SAFETY DEVICE FOR LIMITING DECELERATION

CROSS REFERENCE TO RELATED APPLICATIONS

This application is a U.S. National Stage Entry of International Patent Application Serial Number PCT/EP2017/073079, filed Sep. 14, 2017, which claims priority to German Patent Application No. DE 10 2016 118 028.9, filed Sep. 23, 2016, the entire contents of both of which are incorporated herein by reference.

FIELD

The present disclosure generally relates to transportation devices, including safety mechanisms for limiting deceleration in transportation devices.

BACKGROUND

Transportation devices, especially elevator installations, escalators and moving walkways without cables and chain drives occasionally employ electromagnetic linear drives making it possible to move elevator cars individually along vertical as well as horizontal travel path sections and to transport moving walkway platforms or escalator platforms individually without chain links along the travel path. Electromagnetic linear drives comprise in this case at least one fixed linear stator, which is mounted in several parallel or sequential stator segments with separate stator windings along the travel path, for example in an elevator shaft, and at least one linear runner, corresponding in the context of the present invention to an elevator car or a platform.

Instead of the elevator car or the platform, we shall therefore consider the runner. The runner stands in a non-contact, yet exceedingly close magnetic coupling with the stator, in order to generate the largest possible action of the force of the traveling wave generated by the stator and the strongest and most concentrated magnetic flux in the core of the stator and in the runner. Typically, permanent magnet runners are used, so that no transmission of electrical power to the runner is required and it is possible to realize static magnetic holding forces. This is a so-called synchronous drive system.

A short circuit in a stator segment of a linear drive, due to strong eddy currents induced in the stator winding, similar to the principle of action of an eddy current brake, may lead to excessive undesirable decelerations of the runner and thus of the elevator car as it passes over that segment. If the decelerations are so strong as to exceed the acceleration of gravity, for example, a substantial risk of an accident will exist for the persons and loads being transported, especially during upward travel. Besides a winding short circuit, mechanical faults such as jams and collisions between stator and runner may also lead to serious decelerations with risk of an accident.

Risks of an accident also exist for escalators and moving walkways when platforms are stopped abruptly due to electrical or mechanical faults. These risks are even greater for individually driven platforms than for chain-linked escalators and moving walkways, since higher speeds can be achieved. Moreover, the permissible forces of deceleration are much less for horizontally moving transportation systems as compared to vertical elevator installations.

Automatic safety brakes are known from elevator engineering with linear drive, which close automatically upon unwanted downward movement and open automatically during an upward movement. Corresponding safety brake systems are shown by the documents U.S. Pat. Nos. 5,234,079A and 6,425,462B1.

Thus a need exists for electromagnetic linear drives with a safety device for limiting deceleration and for transportation devices with such linear drives, wherein the safety device is automatically engaged upon an electrical or mechanical fault of the linear drive and requires no independent power supply or activation in order to carry out the safety function.

DETAILED DESCRIPTION

Figure 1:
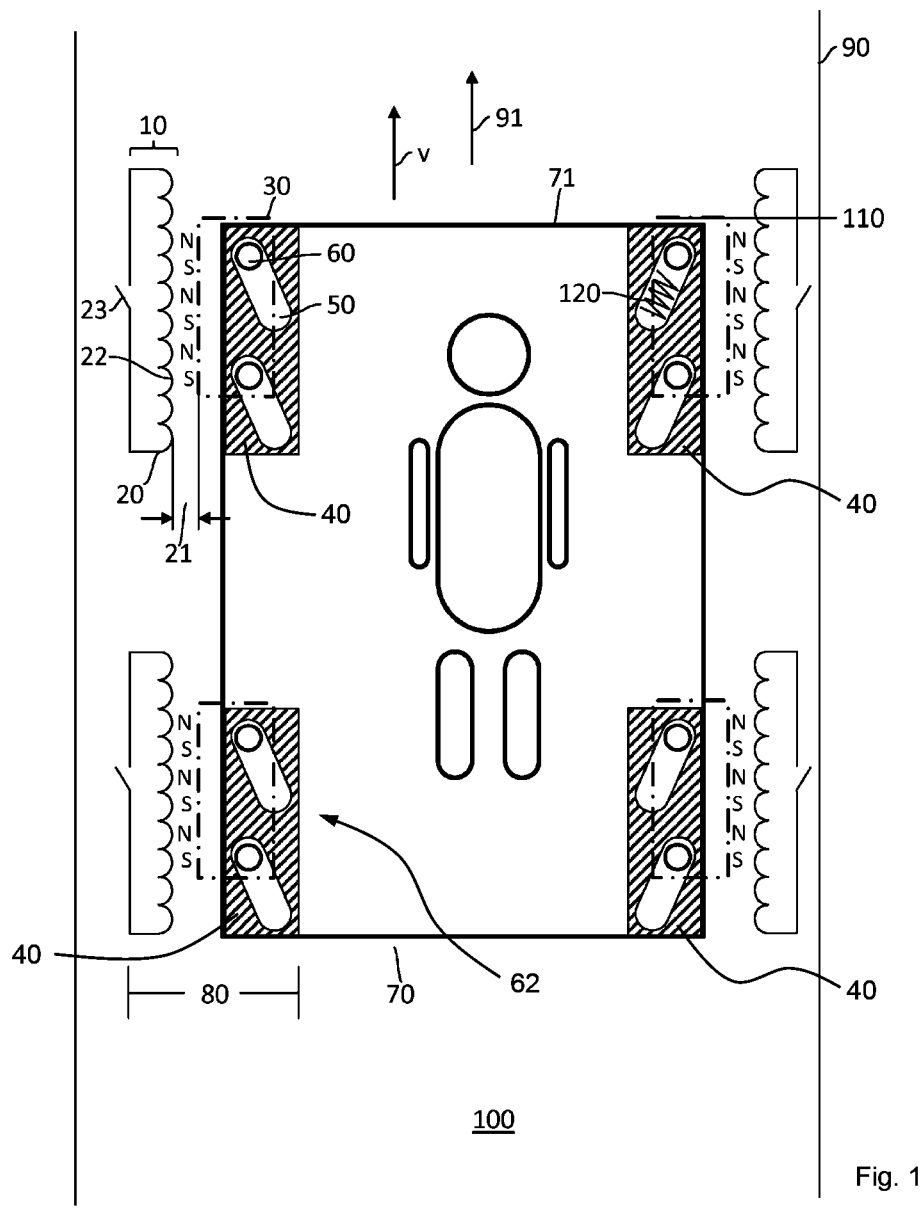
FIG. 1 is a schematic view of an example transportation device configured as an elevator installation that includes an example linear drive.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

A transportation device according to the invention, namely an elevator installation, escalator or moving walkway, comprises a person conveying unit, namely an elevator car or platform, and an electromagnetic linear drive for driving the person conveying unit, having at least one stator and at least one runner, wherein the stator comprises at least one stator segment and the runner at least one runner element, wherein the runner can be driven via the runner element by the action of force of an electromagnetic field of the stator segment being driven over in a first drive direction or in an opposite second drive direction, and wherein the runner element is movably mounted on the runner by means of a safety device in such a way that an air gap between the stator segment being driven over and the runner element can be changed depending on an acceleration or deceleration acting on the person conveying unit.

The magnetic resistance within the air gap is substantially defined by the following mathematical relation:

$$R_m = \frac{l}{\mu_0 \mu_r A}$$

where l is the air gap length (lengthwise to the flux direction)
$\mu_0$ is the permeability of a vacuum,
$\mu_r$ is the relative permeability of air, and
A is the cross section area of the air gap (transversely to the flux direction).

Since air has a permeability around $10^4$ times greater than iron, the magnetic resistance in the air gap increases very much even if the length of the air gap increases only slightly and/or the cross section area of the air gap decreases.

The transportation device according to the invention has the advantage of greater safety and reliability as compared to the prior art, since upon reaching or exceeding a preset acceleration or deceleration the action of the force of the stator segment being driven over on the runner element and thus the runner is automatically interrupted by a change in the air gap. Advantageously, this safety device requires no independent power supply and no active actuation. Since, upon reaching or exceeding a preset acceleration or deceleration, only the stator segment being driven over is deactivated, the functionality of the transportation device as a whole is preserved with adequate redundancy and dimensioning of the stator segments.

According to one advantageous embodiment, the runner element is movably mounted between a first position and a second position by means of the safety device. Advantageously, upon reaching or exceeding a preset acceleration or deceleration of the runner element this abolishes the coupling between runner element and stator segment, so that the acceleration or deceleration cannot be transmitted to the elevator car or the platform.

In order at the same time to advantageously abolish the magnetic coupling between the one runner element and the one stator segment, according to another advantageous embodiment the magnetic resistance in the air gap between the stator segment being driven over and the runner element is smaller in the first position than in the second position.

According to one advantageous embodiment, the runner element is designed such that the runner element is forced into the first position when driven in the first drive direction, especially in the upward direction or forward direction, or upon deceleration in the second drive direction, at least above a predetermined acceleration value or deceleration value. In this way, the length of the air gap can become smaller and/or the cross section area of the air gap can become larger, making possible or increasing the transfer of force between stator and runner when the runner, namely the elevator car or the platform, is being driven in the first drive direction, especially upward or forward, or is being decelerated in the second drive direction, especially downward or backward. In both instances, a drive force acts on the runner, namely the elevator car or the platform, in the first drive direction, especially upward or forward.

According to another advantageous embodiment, the runner element is forced into the second position when driven in the second drive direction, especially in the downward direction or backward direction, or upon deceleration in the first drive direction, at least above a predetermined acceleration value or deceleration value. In this way, the air gap length can become larger and/or the cross section area of the air gap can become smaller, and the transfer of force between stator and runner is prevented or decreased when the runner, namely the elevator car or the platform, is being driven in the second drive direction, especially downward or backward, or is being decelerated in the first drive direction, especially upward or forward. In both instances, a drive force acts on the runner, namely the elevator car or the platform, in the second drive direction, especially downward or backward.

Preferably a forcing of the runner element into the first or second position is done by the drive force itself which is present between the stator segment and the runner element. This advantageously simplifies the construction of the safety device and enhances the reliability.

Preferably the runner element can move other than in the drive direction, especially transversely or diagonally to the drive direction, especially at a predetermined angle to the drive direction or on a predetermined trajectory or on a predetermined circular arc segment, and the predetermined angle between the directions of movement of the runner element and the drive direction is between 5 and 45 degrees, preferably between 15 and 30 degrees. Advantageously, this brings about a suitable constraining force which can move the runner element out from the field of force of the stator.

Preferably the runner element can be displaced and/or swiveled in a straight line. This configuration offers the advantage of an especially simple and reliable construction.

According to one advantageous embodiment, the runner element is moved out from the field of force of the stator segment being driven over by means of the safety device upon change in the drive direction, at least above a predetermined acceleration value or deceleration value, by a self-acting mechanical constraining force. Advantageously, the safety device therefore requires no active actuating system and no active actuating drive, but instead the safety function is produced by a constraining force from the drive force provided by the stator.

According to one advantageous embodiment, the runner element is movably mounted on the runner by means of the safety device between a first position and a second position in such a way that the mounting has elements coordinated with each other, especially inter-meshing elements, which allow relative movements between the runner element and the runner with one or more predetermined mechanical degrees of freedom and which carry out these relative movements by mechanical constraining forces. Advantageously, various combinations of mechanically coordinated elements may be used, such as bolts and oblong holes, rollers and rails, or rails or guide elements sliding on one another. These have the advantage that the safety function is reversible, without requiring maintenance or repair of the transportation device.

According to another advantageous embodiment, the runner element is mounted on the runner by means of the safety device between a first position and a second position in such a way that the mounting has one or more predetermined breaking points, which can be separated upon exceeding given acceleration forces or deceleration forces. The separable units may be secured by arresting cables. This embodiment has the advantage of even better reliability even under extremely large acceleration or deceleration forces.

According to one advantageous embodiment, the runner has at least two parallel oblong holes, which are arranged at an acute angle to the direction of movement of the runner, wherein the runner element is displaceably mounted by at least two spaced-apart bolts in the parallel oblong holes in such a way that the runner element upon reaching or exceeding a preset deceleration of the runner element is moved away from the stator segment being driven over by a displacement in the parallel oblong holes and is moved out from the electromagnetic field of the stator segment being driven over. By the changing of the air gap between the defective stator segment and the runner element according to this advantageous embodiment, the action of the force on the runner is interrupted and an undesirable deceleration of the runner and thus of the elevator car is avoided. The oblong holes are arranged on the runner, the bolts on the movable runner element. This advantageous embodiment has a simple construction and a high functional safety.

According to one advantageous embodiment, the runner element has at least two parallel oblong holes, which are arranged at an acute angle to the direction of movement of the runner, wherein the runner is displaceably mounted by at least two spaced-apart bolts in the parallel oblong holes in such a way that the runner element upon reaching or exceeding a preset deceleration of the runner element is moved away from the stator segment being driven over by a displacement in the parallel oblong holes and is moved out from the electromagnetic field of the stator segment being driven over. By the changing of the air gap between the defective stator segment and the runner element according to this advantageous embodiment, the action of the force on the runner is interrupted and an undesirable deceleration of the runner and thus of the elevator car is avoided. The oblong holes are arranged on the movable runner element, the bolts on the runner. This advantageous embodiment likewise has a simple construction and a high functional safety.

According to another advantageous embodiment, the runner element is arranged on the runner by means of rotating arms. This advantageous embodiment has a simple construction and especially low maintenance expense and it can be combined with displaceable lay-outs.

Preferably the runner element is a permanent magnet runner element. Advantageously in the case of a permanent magnet runner, no transfer of electrical energy to the runner is required.

Preferably the mounting of the runner element in both of the previous embodiments has an end position, so that the safety device can only be active in one direction of travel, especially only during upward travel. In the case of the embodiment with oblong holes, such an end position is dictated by the top boundaries of the oblong holes. In the case of the embodiment with parallel rotating arms, a mechanical limiting of the angle of rotation is proposed. This advantageously makes possible a limiting of deceleration during upward travel, while there is no limiting of deceleration in the case of an emergency braking during downward travel.

According to another advantageous embodiment, the mounting of the runner element has damper elements. This advantageously reduces mechanical loads on the transportation device.

According to another advantageous embodiment, the mounting of the runner element has restoring elements. In this way, the runner element can be advantageously forced into the first position upon loss of force into the second position.

According to another advantageous embodiment, the preset deceleration of the runner element during upward travel corresponds at most to the acceleration of gravity. This presetting has the advantage that forces of gravity acting on the persons or objects being transported cannot be completely abolished or reversed by deceleration forces.

Further benefits and embodiments of the invention will emerge from the description and the accompanying drawings.

Of course, the features mentioned above and yet to be explained in the following may be used not only in the particular indicated combination, but also in other combinations or standing alone, without leaving the scope of the present invention.

In FIG. 1, an elevator installation as the transportation device according to the invention is shown schematically and designated overall as 100. The elevator installation 100 comprises, as the person conveying unit, an elevator car 71, which can move vertically in an elevator shaft 90 in the upward direction 91 and downward direction 92. Likewise, though not shown in detail, the transportation device may be a moving walkway or an escalator with a platform 71 as the person conveying unit.

The elevator installation 100 is designed with a linear drive 80. This comprises at least one stator 10 and at least one runner 70, each stator 10 having at least one stator segment 20 and each runner 70 having at least one runner element 30. Each stator segment 20 has a separate stator winding 22, whereby a possible winding short circuit in this stator winding can be indicated by a switch 23. The runner element 30 is preferably designed as a permanent magnet. A squirrel-cage runner or a runner with a runner winding would also be conceivable. Between the stator segment 20 and the runner element 30 there stretches an air gap 21 with an air gap length. In the schematic representation, four stator segments 20 are shown, only one of which is provided with more detailed reference numbers.

The problem in such linear drives, besides a mechanical damaging of the runner, is the possibility of a winding short circuit in a stator winding. Similar to the principle of action of an eddy current brake, a runner moving with respect to the stator winding induces in this case an induction voltage and, because of a short-circuited stator winding, an induction current, whose magnetic force action by Lenz' rule works against the induction source and greatly decelerates the movement of the runner and thus of the elevator car. A defect in the inverter may also bring about a spontaneous reversal of the drive force and thus a massive deceleration. This deceleration may represent a danger in the case of fast speeds of travel.

A safety device 40 of the electromagnetic linear drive 80 according to the invention should therefore intervene when at least one runner element 30 reaches or exceeds a preset deceleration especially during upward travel due to an electrical or mechanical fault upon passing over a stator segment 20.

The safety device 40 enables a guided movable mounting of the runner element 30 on the runner 70. For this, the runner element 30 can basically move between a first position 61 and a second position 62. The two positions 61, 62 are shown schematically in detail relative to each other at the left margin of the image in FIG. 1. In the first position 61, the runner element is situated closer to the stator 10 and thus is exposed much more strongly to the magnetic influence of the stator than in the second position 62.

As shown in FIG. 1, in this embodiment an arrangement of spaced-apart bolts 60 on the runner element 30 engages with a correspondingly spaced-apart arrangement of parallel oblong holes 50 on the runner 70 and can be displaced in parallel in them. The parallel oblong holes 50 enable a guided movement of the runner element 30 with respect to the runner 70. The oblong holes 50 are arranged at an acute angle to the direction of movement of the runner 70, so that a displacement of the runner element 30 opposite the direction of movement of the runner 70 moves the runner element 30 away from the stator segment 20 diagonally to the direction of movement of the runner 70, so that the magnetic force action is interrupted or at least greatly reduced in the direction of movement of the runner 70.

The bolts 60 can be arranged both on the runner 70 and on the runner element 30, if the other respective element has the correspondingly spaced-apart oblong holes 50.

The angle of the parallel oblong holes 50 with respect to the direction of movement of the runner 70 should be chosen advantageously such that, on the one hand, a sufficient transverse movement occurs in order to move the runner element 30 out from the force field, yet on the other hand the constraining force is sufficient to move the runner element 30 against the transversal component of the magnetic force out from the field of the stator segment 20. An angle between 5 and 45 degrees is proposed, especially between 15 and 30 degrees.

Thanks to the moving of the runner element 30 from the first position to the second position, the action of the force between the runner element 30 and the stator segment 20 in the direction of movement of the runner 70 is interrupted or at least reduced so much that a strong deceleration of the elevator car 71 can no longer be produced. Given a suitable design of the linear drive, the elevator car 71 can continue its travel with the remaining stator segments. Advantageously, furthermore, restoring elements 120 are arranged on the runner elements 30, which can place the runner elements 30 back in the oblong holes 50 once the faulty stator segment 20 has been passed over and/or there is no forcing of the runner element 30 into the second position.

Figure 2:
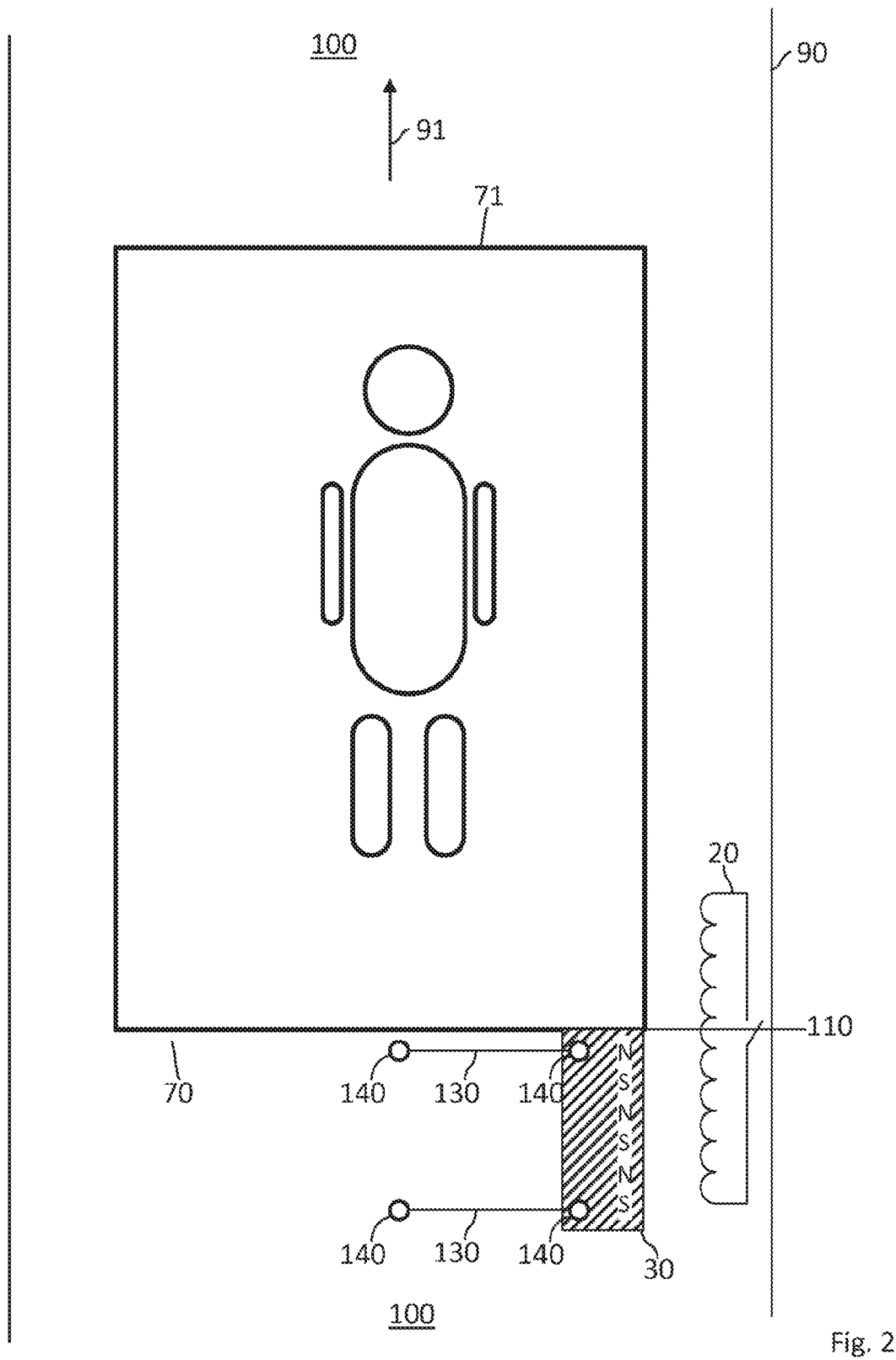
FIG. 2 is a schematic view of another example transportation device configured as an elevator installation that includes another example linear drive.

FIG. 2 shows a schematic representation of another elevator installation 100 with an elevator car 71, which can move in an elevator shaft 90. The same parts as have already been described in connection with FIG. 1 are given the same reference numbers and will not be mentioned again individually. In this exemplary embodiment, the runner element 30 is swivel-mounted on the runner 70. The movement of the runner element 30 in relation to the stator segment 20 is made possible by an arrangement of parallel rotating arms 130, which swivel the runner element 30 out from the magnetic force field in event of a fault by means of rotary bearings 140 arranged on the runner 70 and on the runner element 30 and interrupt the action of the force. Advantageously, the rotary bearings 140 have an end position 110, which may be arranged for example on the bottom plate of the runner 70. FIG. 2 shows the runner element 30 in the first position; the second position is not drawn here explicitly; in the second position, the runner element 30 is swiveled away downward clockwise, so that the distance from the stator segment is increased.

The length of the rotary arms 130 may also be different and instead of a parallelogram it may represent a general rectangle, so that besides the swivel movement there is an additional rotation of the runner element 30. Likewise, rotational devices and displacement devices, especially rotating arms, oblong holes, rails and bolts can be combined with each other, for example by having rotary bearings interacting with oblong holes in the shape of a circle segment.

Advantageously, damper elements 120 and restoring elements 121 are additionally arranged in the rotary bearings 140 or on the rotating arms 130 (see FIG. 1).

A holding system with a predetermined breaking point is also conceivable. In order not to lose the component after a breakage at the predetermined breaking point, the component could be secured by a steel cable. In place of a predetermined breaking point, a latch with roller spring pressure element could also be used. This approach is advantageous in the case of moving walkways.

Figure 3A:
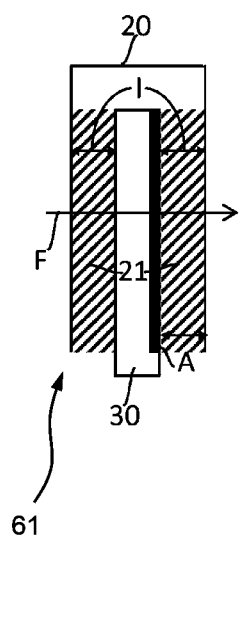
FIGS. 3a and 3b are schematics depicting an increase of magnetic resistance by decreasing a cross-sectional area of an air gap.
Figure 3B:
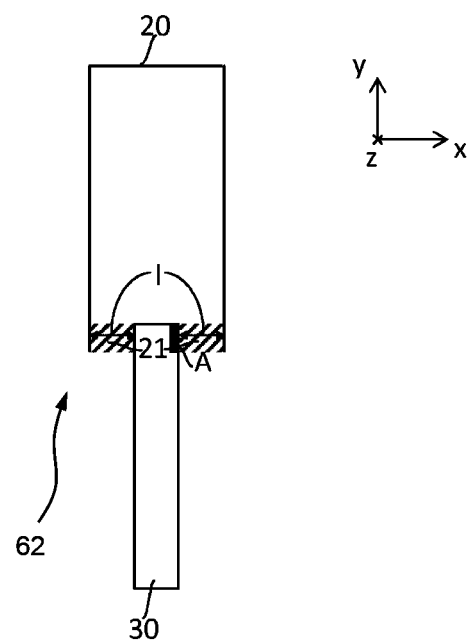

FIG. 3 explains schematically the possibility of increasing the magnetic resistance. FIG. 3a shows schematically the stator segment 20 and the runner unit 30. The stator segment 20 has a U-shaped receiving space, with which the runner element 30 engages. F indicates the direction of the magnetic flux. Thanks to the specific overlapping between stator segment 20 and runner element 30, an air gap length l and a cross section area A of the air gap 21 are produced. The air gap 21 and air gap length l here are understood to be the sum of the regions or partial lengths shown on the left and right of the runner element. FIG. 3a shows the runner unit in the first position. By a corresponding mounting, the runner unit 30 can be moved to a second position, as shown in FIG. 3b. The air gap length l will remain unchanged, although the cross section area A is significantly reduced.

Figure 4A:
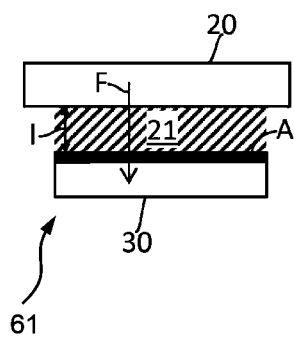
FIGS. 4a and 4b are schematics depicting an increase of magnetic resistance by increasing a length of an air gap.
Figure 4B:
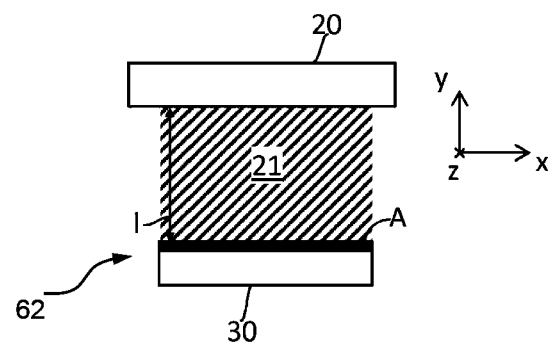

FIG. 4 shows schematically a further possibility for increasing the magnetic resistance. FIG. 4a shows schematically the stator segment 20 and the runner unit 30. The stator segment 20 is arranged parallel to the runner element 30. Thanks to the specific arrangement between the stator segment 20 and the runner element 30, an air gap length l and a cross section area A of the air gap 21 are produced. FIG. 4a shows the runner unit in the first position. By a corresponding mounting, the runner unit 30 can be moved to a second position, as shown in FIG. 4b. The air gap length l will be significantly increased; the cross section area A of the air gap remains largely unchanged.

It is basically critical that the movement from the first position to the second position takes place in a direction other than the drive direction, in particular with at least one directional component transversely to the drive direction. In the present instance of FIGS. 3 and 4, the drive direction is parallel to the z-direction, but the runner element 30 is moved parallel to the y-direction. Of course, the runner element 30 may also additionally be moved parallel to the z-direction.

What is claimed is:

1. A transportation device comprising:
   a person conveying unit; and
   an electromagnetic linear drive configured to drive the person conveying unit by an electromagnetic drive force along a travel path, the electromagnetic linear drive including,
      a stator segment, and
      a runner element movably mounted to the person conveying unit and defining an air gap between the runner element and the stator segment, such that a width of the air gap is adjustable by movement of a position of the runner element on the person conveying unit, the runner element configured to:
         be driven with respect to the stator segment in a first drive direction, or in a second drive direction opposite the first drive direction, by an electromagnetic field generated by the stator segment in the air gap, and
         change position on the person conveying unit, so as to change a resulting width of the air gap, in response to a change in the electromagnetic drive force from the stator acting on the runner element, thereby adjusting a magnetic resistance between the stator segment and the runner element in the air gap.

2. The transportation device of claim 1, wherein the runner element is movable on the person conveying unit between a first position and a second position.

3. The transportation device of claim 2 wherein the magnetic resistance in the air gap is smaller in the first position than in the second position.

4. The transportation device of claim 2 wherein the runner element is mounted such that the runner element is forced into the first position when the drive force acts in the first drive direction.

5. The transportation device of claim 2 wherein the runner element is mounted such that the runner element is forced into the second position when the drive force acts in the second drive direction.

6. The transportation device of claim 5 wherein the drive force present between the stator segment and the runner element is solely responsible for forcing the runner element into the second position.

7. The transportation device of claim 1 wherein the runner element is movable in a direction that is transverse to the first and second drive directions.

8. The transportation device of claim 1 wherein the runner element is configured to be displaced or swiveled in a straight line.

9. The transportation device of claim 1, further comprising a safety device configured to move the runner element, by a self-acting mechanical constraining force, out of the electromagnetic field of the stator segment upon a change in the drive direction of the drive force acting on the runner element and causing an acceleration or deceleration in the runner element above either a predetermined acceleration value or deceleration value.

10. The transportation device of claim 9, wherein the runner element is movably mounted on a runner, by way of a mounting provided by the safety device, between a first position and a second position, wherein the mounting has elements coordinated with each other that permit relative movements between the runner element and the runner with one or more predetermined mechanical degrees of freedom and that perform the relative movements by mechanical constraining forces.

11. The transportation device of claim 9, wherein the runner element is mounted on a runner by way of a mounting provided by the safety device and is movable on the runner between a first position and a second position, wherein the mounting includes at least one predetermined breaking point configured to be broken when predetermined acceleration forces or deceleration forces are exceeded.

12. The transportation device of claim 11 wherein the runner element includes at least two parallel oblong holes disposed at an acute angle to a direction of movement of the runner, wherein the runner is displaceably mounted by at least two spaced-apart bolts in the two parallel oblong holes such that the runner element upon reaching or exceeding a preset deceleration of the runner element is moved away from the stator segment by a displacement in the two parallel oblong holes and is moved out from the electromagnetic field of the stator segment.

13. The transportation device of claim 11 wherein the runner includes at least two parallel oblong holes disposed at an acute angle to a direction of movement of the runner, wherein the runner element is displaceably mounted by at least two spaced-apart bolts in the two parallel oblong holes such that the runner element upon reaching or exceeding a preset deceleration of the runner element is moved away from the stator segment by a displacement in the two parallel oblong holes and is moved out from the electromagnetic field of the stator segment.

14. The transportation device of claim 13 wherein the preset deceleration of the runner element during upward travel corresponds at most to gravitational acceleration.

15. The transportation device of claim 1 wherein the runner element is disposed on a runner by way of rotating arms.

16. The transportation device of claim 1 wherein the runner element is a permanent magnet runner element.

17. The transportation device of claim 1 wherein a mounting of the runner element has an end position.

18. The transportation device of claim 1 wherein a mounting of the runner element has damper elements.

19. The transportation device of claim 1 wherein a mounting of the runner element has restoring elements that force the runner element into the first position upon loss of force.

20. The transportation device of claim 1 wherein the runner element is movable in a direction that forms an angle of between 15 and 30 degrees relative to the first and second drive directions.

* * * * *